United States Patent [19]

Zawisa

[11] Patent Number: 4,949,994

[45] Date of Patent: Aug. 21, 1990

[54] HEIGHT ADJUSTABLE SHOULDER BELT GUIDE LOOP

[75] Inventor: Kenneth M. Zawisa, Farmington Hills, Mich.

[73] Assignee: General Motors Corporation, Detroit, Mich.

[21] Appl. No.: 389,459

[22] Filed: Aug. 4, 1989

[51] Int. Cl.⁵ .............................................. B60R 22/04
[52] U.S. Cl. .................................... 280/802; 280/808; 403/93; 248/291
[58] Field of Search .............. 280/801, 802, 803, 807, 280/808; 297/468, 483, 473; 403/93; 248/297.3, 291

[56] References Cited

U.S. PATENT DOCUMENTS

| | | | |
|---|---|---|---|
| 3,561,713 | 2/1971 | Berkowitz | 248/291 |
| 4,398,749 | 8/1983 | Hipp et al. | 280/808 |
| 4,640,550 | 2/1987 | Hakansson | 297/468 |
| 4,895,392 | 1/1990 | Schut et al. | 280/808 |

FOREIGN PATENT DOCUMENTS

| | | | |
|---|---|---|---|
| 2539359 | 3/1977 | Fed. Rep. of Germany | 297/483 |
| 2225011 | 10/1974 | France | 280/801 |

Primary Examiner—Charles A. Marmor
Assistant Examiner—Tamara L. Finlay
Attorney, Agent, or Firm—Charles E. Leahy

[57] ABSTRACT

A mounting bracket is mounted on the vehicle and has a plurality of teeth displayed in an arcuate path about a pivot. The mounting bracket also has a vertically extending guide slot interposed between the pivot and the teeth. An arm is mounted on the pivot and has teeth thereon engageable with the teeth of the mounting bracket to lock the arm against pivotal movement. The arm also has a guide slot extending radially with respect to the pivot. A guide loop having the belt slidable therethrough is connected to a guide pin which is slidably guided in both the vertical guide slot of the mounting bracket and the radial slot of the arm so that pivotal movement of the arm about the pivot moves the guide loop vertically along the vertical guide slot of the mounting bracket to adjust the height of the shoulder belt. A spring washer surrounds the pivot and acts between the arm and the mounting bracket to urge the arm relative the mounting bracket to a normal position in which the teeth of the arm lock into engagement with the teeth of the mounting bracket.

4 Claims, 2 Drawing Sheets

HEIGHT ADJUSTABLE SHOULDER BELT GUIDE LOOP

The invention relates to a guide loop slidably mounting a seat belt on a vehicle and more particularly provides a height adjustable guide loop suited for mounting on a vehicle door.

BACKGROUND OF THE INVENTION

It is well known in motor vehicle seat belt systems to mount the shoulder belt on the vehicle body via a guide loop which slidably receives the belt to anchor the belt above the occupant shoulder. The outboard end of the shoulder belt is attached to the body by a retractor which winds and unwinds the belt so that the belt may slidably pass through the guide loop.

It is also known in the prior art to mount the guide loop on the vehicle body via a height adjustable mechanism which permits the guide loop to be raised and lowered somewhat as desired to adjust angle of the shoulder belt across the upper torso of the occupant.

The present invention provides a new and improved height adjustable guide loop which is particularly well suited for mounting on the upper rear corner of the door in a passive seat belt system.

SUMMARY OF THE INVENTION

According to the invention a mounting bracket is mounted on the vehicle and has a plurality of teeth displayed in an arcuate path about a pivot. The mounting bracket also has a vertically extending guide slot interposed between the pivot and the teeth. An arm is mounted on the pivot and has teeth thereon engageable with the teeth of the mounting bracket to lock the arm against pivotal movement. The arm also has a guide slot extending radially with respect to the pivot. A guide loop having the belt slidable therethrough is connected to a guide pin which is slidably guided in both the vertical guide slot of the mounting bracket and the radial slot of the arm so that pivotal movement of the arm about the pivot moves the guide loop vertically along the vertical guide slot of the mounting bracket to adjust the height of the shoulder belt. A spring washer surrounds the pivot and acts between the arm and the mounting bracket to urge the arm relative the mounting bracket to a normal position in which the teeth of the arm lock into engagement with the teeth of the mounting bracket. The arm is mounted adjacent the face of the mounting bracket opposite from the occupant and the guide loop is mounted adjacent the face of the mounting plate next to the occupant so that the occupant may press the guide loop in the direction away from the occupant in order to effect disengagement of the teeth of the arm from the teeth of the mounting bracket to permit height adjustment of the guide loop and the shoulder belt.

Accordingly, the object, feature and advantage of the invention resides in the provision of a new and improved vertically adjusted guide loop for a vehicle body shoulder belt in which the guide loop is mounted on a swinging arm which is locked by engaging teeth acting between the arm and mounting bracket and the teeth are selectively disengageable to enable vertical adjusting movement of the guide loop by swinging movement of the arm.

These and other features, objects and advantages of the invention will become apparent upon consideration of the detailed description of the preferred embodiment and the appended drawings in which.

DESCRIPTION OF THE PREFERRED EMBODIMENT

Figure 1:
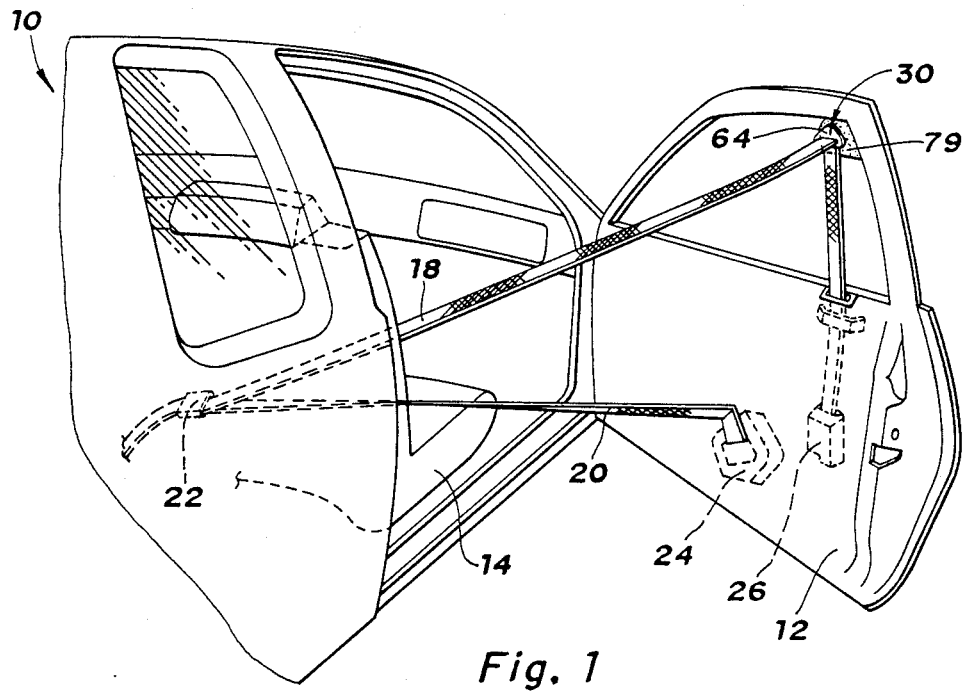
FIG. 1 is a perspective view of a vehicle body having a seat belt system with the height adjustable guide loop of the present invention.

Referring to FIG. 1 it is seen that a vehicle body 10 includes a door 12 hingedly mounted for movement between opened and closed positions. An occupant seat 14 is mounted in the passenger compartment adjacent to the door 12.

A passive seat belt system is provided to restrain the occupant in the seat 14. A shoulder belt 18 and a lap belt 20 have their inboard ends mounted on the vehicle body 10 inboard the seat 14 by a release buckle 22. The outboard end of the lap belt 20 is mounted on the lower rear corner of the door by a retractor 24. The outboard end of the shoulder belt is mounted in the lower rear corner of the door by retractor 26. The shoulder belt 18 passes vertically from the shoulder belt retractor 26 to a guide loop assembly 30 which is mounted on the upper rear corner of the door 12.

Figure 2:
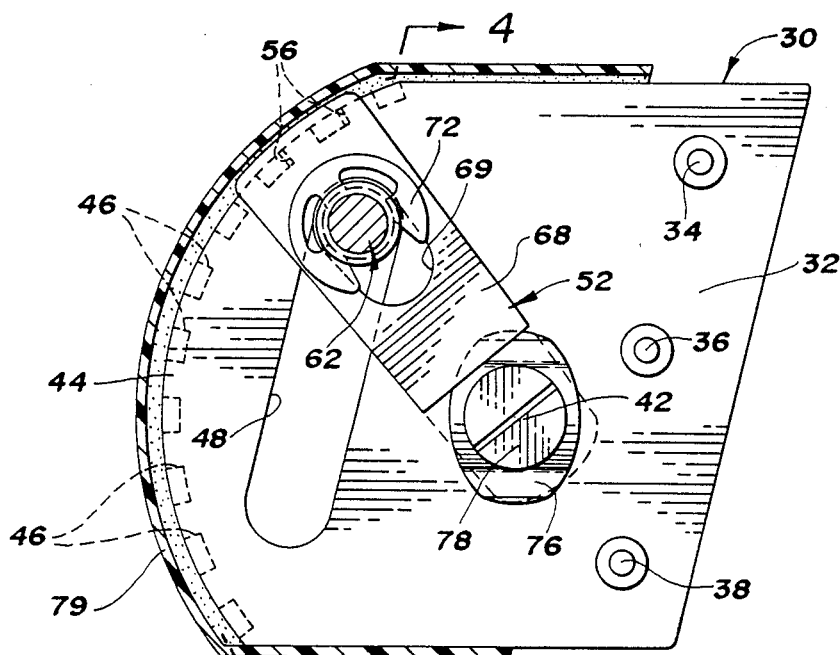
FIG. 2 is a side elevation view of the height adjustable guide loop having parts broken away and in section.
Figure 4:
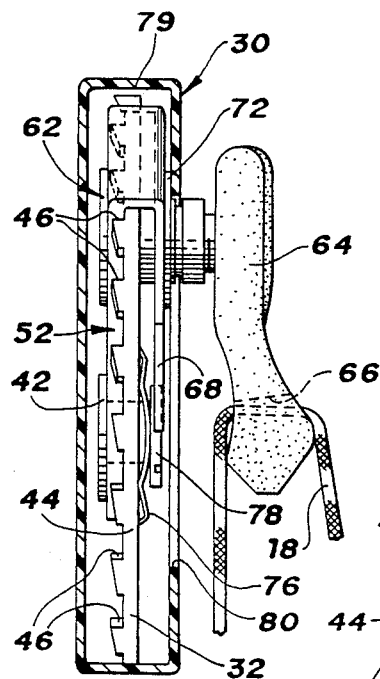
FIG. 4 is a end view of the height adjustable guide loop of FIG. 2.
Figure 6:
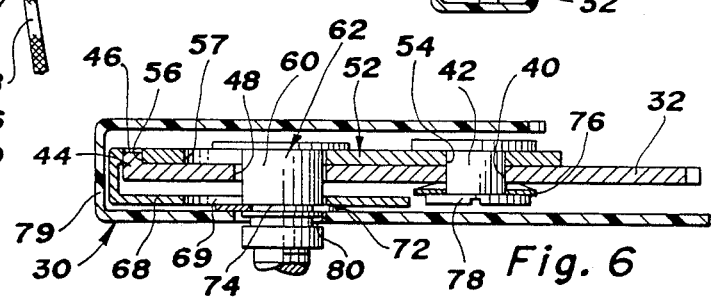
FIG. 6 is a section view taken in the direction of arrows 6—6 of FIG. 3.

Referring to FIGS. 2 and 4, it is seen that the guide loop assembly 30 includes a mounting bracket 32 having holes 34, 36 and 38 by which the mounting bracket is attached by screws to the upper rear corner of the door 12. As best seen in FIG. 6 the mounting bracket 32 has an aperture 40 which mounts a pivot pin 42. Mounting bracket 32 also has a flanged edge 44 which is displayed in an arc about the pivot pin 42 and carries a plurality of teeth 46 which project outwardly from the bracket in a direction parallel with the axis of the pivot 42 and away from the seated occupant. As best seen in FIGS. 2 and 6 the mounting bracket also has a guide slot 48 which extends generally vertically and is interposed between the pivot pin 42 and the teeth 46.

Figure 5:
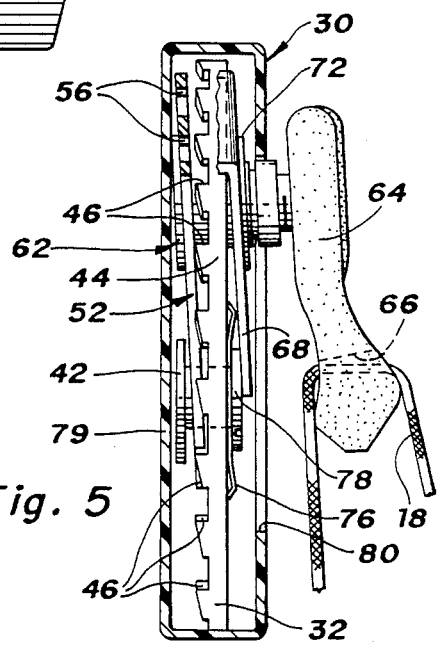
FIG. 5 is a view similar to FIG. 4 but showing the mounting arm disengaged from the mounting bracket to permit height adjusting movement.

As best seen in FIGS. 2 and 6, a mounting arm 52 is juxtaposed with the mounting bracket 30 on the face thereof opposite from the occupant and has an aperture 54 which receives the pivot pin 42 to pivotally mount the mounting arm 52 on the mounting bracket 30. As best seen in FIGS. 5 and 6 the end of the mounting arm 52 opposite pivot pin 42 has a plurality of teeth 56 defined therein by apertures and being engageable with the teeth 46 of the mounting bracket 30. In addition, the mounting arm 52 has a guide pin slot 57 therein which extends radially from the pivot pin 42 and slidably engages the shank portion 60 of a guide pin 62.

As best seen in FIG. 5 the seat belt guide loop 64 is mounted on the end of the guide pin 62 and has a belt receiving slot 66 through which the shoulder belt 18 slidably passes.

Referring to FIGS. 4 and 6 it is seen that the mounting arm 52 has a retorsely bent arm portion 68 thereof which reaches around the flanged edge 44 of the mounting bracket and lies parallel to the mounting bracket 30 but is spaced somewhat therefrom. This arm portion 68 has a guide pin slot 69 which receives the shank portion 60 of the guide pin 62. A washer 72 is seated within a recess 74 of the guide pin 62 and seats against the arm portion 68.

As best seen in FIGS. 2 and 6 a spring washer 76 encircles the pivot pin 42 and is seated between the mounting bracket 30 and a head 78 of the pivot pin 42 to urge the pivot pin 42 in the inward direction which causes the mounting arm 52 to closely overly the mounting bracket 30 and retain the teeth 46 of the mounting arm 52 in locking engagement with the teeth 44 of the mounting bracket 30.

VERTICAL HEIGHT ADJUSTMENT OF GUIDE LOOP ASSEMBLY

FIG. 2 shows the guide loop adjusted to the highest position. The guide loop is maintained at this highest position by the locking engagement of the teeth 56 on the mounting arm 52 with the teeth 46 of the mounting bracket 30. The spring washer 74 urges the pivot pin 42 inwardly of the vehicle so that the mounting arm 52 is biased into engagement against the mounting bracket 32 to retain the locking engagement between the teeth 46 and 56.

When the occupant wishes to adjust the vertical height of the shoulder belt 18, the occupant presses the guide loop 64 outboard of the vehicle in the leftward direction as viewed in FIG. 5. As seen in FIG. 5, this leftward movement of the guide loop 64 moves the guide pin 62 leftwardly as permitted by yielding of the spring washer 74 so that the mounting arm 52 is moved away from the mounting bracket 30 to disengage the teeth 56 of the mounting arm 52 from the teeth 46 of the mounting bracket 30. With the teeth thus disengaged, the mounting arm may be pivoted downwardly about the pivot pin 42 to the position of FIG. 3. It will be appreciated that the vertically extending slot 48 determines the path of the guide pin 62 in the vertical direction and the guide pin slot 56 of the mounting arm 52 and 69 of the mounting arm portion 68 will permit the mounting pin 60 to move somewhat radially with respect to the pin 42 in order to accommodate this path of motion defined by the pin slot 48.

Figure 3:
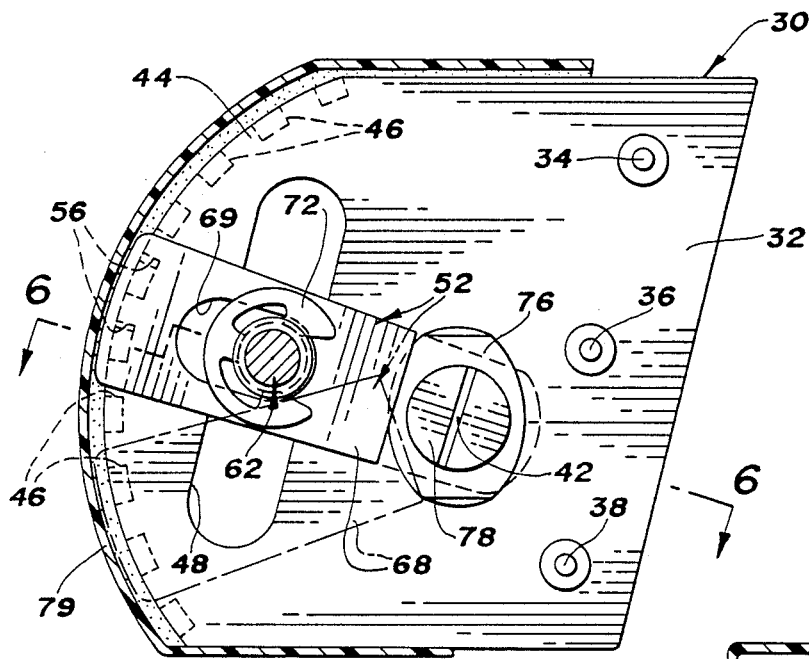
FIG. 3 is a view similar to FIG. 2 but showing the guide loop vertically adjusted to a different position from that shown in FIG. 2.

When the guide loop 64 reaches the desired adjusted position of FIG. 3, the occupant merely releases the guide loop 64 so that the spring washer 74 will again restore the mounting arm 52 into close abutting engagement with the mounting bracket 30 to reestablish the locking engagement between the teeth 44 and 46 as shown in FIG. 4.

Referring to FIG. 4 it will be appreciated that the onset of an occupant imposed load on the shoulder belt 18 will tend to pull the guide loop 64 inboard the vehicle which in turn will retain the locking engagement between the teeth 46 and 56.

Referring again to the drawings, it is seen that a molded plastic housing 79 surrounds the guide loop assembly 13 and has a vertical extending slot 80 therein which overlies the guide pin slot 48 of the mounting bracket 32. Accordingly, with the housing 79 in place, the guide loop assembly is effectively concealed except for the presence of the guide loop 64.

Thus it is seen that the invention provides a new and improved height adjustable guide loop assembly for a motor vehicle. Although the preferred embodiment of the invention as shown herein has the guide loop assembly mounted on the upper rear corner of the door, it will be appreciated that the guide loop assembly is equally susceptible to mounting on the pillar of the vehicle body.

The embodiments of the invention in which an exclusive property or privilege is claimed are defined as follows:

1. A guide loop for vertically adjusting a vehicle shoulder belt comprising:
   a mounting bracket mounted on the vehicle and having a pivot, a plurality of teeth displayed in an arcuate path about the pivot and projecting from the bracket in a direction parallel with the axis of the pivot, and a vertically extending guide slot interposed between the pivot and the teeth;
   an arm mounted on the pivot for pivotal movement and having teeth thereon engageable with the teeth of the mounting bracket to lock the arm against pivotal movement and having a guide slot therein extending radially from the pivot;
   a guide loop having the belt slidable therethrough;
   and guide means connected to the guide loop and slidably guided within the vertical guide slot of the mounting bracket and the radial slot of the arm so that pivotal movement of the arm about the pivot as permitted by disengagement of the teeth between the mounting bracket and the arm moves the guide loop vertically along slot of the mounting bracket to adjust the height of the shoulder belt.

2. The combination of claim 1 further characterized by spring means acting between the mounting arm and the mounting bracket to bias the teeth of the mounting arm into engagement with the teeth of the mounting bracket and being yieldable to permit movement of the mounting arm away from the mounting bracket to disengage the teeth of mounting arm from the teeth of the mounting bracket.

3. A guide loop for vertically adjusting a vehicle shoulder belt comprising:
   a mounting bracket mounted on the vehicle and having a pivot, a plurality of teeth displayed in an arcuate path about the pivot and projecting from the bracket in a direction parallel with the axis of the pivot, and a vertically extending guide slot interposed between the pivot and the teeth;
   an arm mounted on the pivot for pivotal movement and having teeth thereon engageable with the teeth of the mounting bracket to lock the arm against pivotal movement and having a guide slot therein extending radially from the pivot;
   a guide loop having the belt slidable therethrough;
   and guide means connected to the guide loop and slidably guided within the vertical guide slot of the mounting bracket and the radial slot of the arm so that pivotal movement of the arm about the pivot moves the guide loop vertically along slot of the mounting bracket to adjust the height of the shoulder belt;
   and a spring washer surrounding the pivot and acting between the arm and the mounting bracket to urge the arm relative the mounting bracket to a normal position in which the teeth of the arm lock into engagement of teeth of the mounting bracket to fix the arm at an arcuate position establishing the guide loop and shoulder belt at a desired height, said spring washer being yieldable in response to movement of the arm to permit disengagement of the teeth of the arm from the teeth of the mounting bracket so that the arm may be pivoted about the pivot to adjust the height of the guide loop and the shoulder belt.

4. The combination of claim 3 in which the guide means is a guide pin extending through the mounting bracket and the arm is mounted on one end of the guide pin on the side of the mounting bracket opposite from the occupant and the guide loop is mounted on the other end of the guide pin in the side of the mounting bracket adjacent the occupant and the teeth on the mounting bracket face in the direction away from the occupant and the teeth on the arm face in the direction toward the occupant so that the occupant may press the guide loop in the direction away from the occupant in order to effect disengagement of the teeth of the arm from the teeth of the mounting bracket so that the arm may be pivoted about the pivot to adjust the height of the guide loop and the shoulder belt.

* * * * *